United States Patent
Negulescu (10) Patent No.: US 10,781,699 B2
(45) Date of Patent: Sep. 22, 2020

(54) ROTOR BLADE FOR A TURBOMACHINE AND METHOD FOR THE ASSEMBLY OF A ROTOR BLADE FOR A TURBOMACHINE

(71) Applicant: Rolls-Royce Deutschland Ltd & Co KG, Blankenfelde-Mahlow (DE)

(72) Inventor: Dimitrie Negulescu, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 131 days.

(21) Appl. No.: 15/695,422

(22) Filed: Sep. 5, 2017

(65) Prior Publication Data

US 2018/0066526 A1    Mar. 8, 2018

(30) Foreign Application Priority Data

Sep. 6, 2016    (DE) .................. 10 2016 216 858

(51) Int. Cl.
  *F01D 5/18* (2006.01)
(52) U.S. Cl.
  CPC ........ *F01D 5/189* (2013.01); *F05D 2220/323* (2013.01); *F05D 2230/60* (2013.01);
  (Continued)
(58) Field of Classification Search
  CPC . F01D 5/189; F01D 5/18; F01D 5/187; F01D 5/188; F05D 2250/14;
  (Continued)

(56) References Cited

U.S. PATENT DOCUMENTS 3,628,885 A * 12/1971 Sidenstick ............. F01D 5/189
                                                                   416/217
3,846,041 A * 11/1974 Albani .................... B23P 15/04
                                                                   416/96 A
(Continued)

FOREIGN PATENT DOCUMENTS

DE   602004002004 T2   4/2007
DE   102015111746 A1   1/2017
(Continued)

OTHER PUBLICATIONS

European Search Report dated Feb. 13, 2018 for counterpart European Application No. 17189024.7.
(Continued)

*Primary Examiner* — Hung Q Nguyen
*Assistant Examiner* — Susan E Scharpf
(74) *Attorney, Agent, or Firm* — Shuttleworth & Ingersoll, PLC; Timothy J. Klima (57) ABSTRACT

A rotor blade for a turbomachine, in particular in an aircraft engine, with a cooling arrangement for cooling a surface inside the rotor blade by means of a cooling medium, in particular cooling air. The rotor blade having an impingement cooling device with a plurality of impingement cooling openings for deflecting the cooling medium flowing in the interior of the impingement cooling device onto the surface that is to be cooled by means of impingement cooling inside the rotor blade and that is located outside of the impingement cooling device, so that the surface can be cooled by means of an impingement cooling through a cooling medium than exits from the impingement cooling openings, wherein the impingement cooling device is movably mounted with respect to the rotor blade.

17 Claims, 6 Drawing Sheets

(52) U.S. Cl.
CPC .... *F05D 2250/14* (2013.01); *F05D 2260/201* (2013.01); *F05D 2260/202* (2013.01); *Y02T 50/676* (2013.01)

(58) Field of Classification Search
CPC ........... F05D 2260/202; F05D 2230/60; F05D 2220/323; F05D 2260/201; F05D 2260/33; Y02T 50/676; F02D 5/18; F02D 5/187; F02D 5/188; F16C 2226/70–78
See application file for complete search history.

(56) References Cited

U.S. PATENT DOCUMENTS

| | | | |
|---|---|---|---|
| 4,314,794 A * | 2/1982 | Holden | F01D 5/182 416/225 |
| 4,396,349 A * | 8/1983 | Hueber | F01D 5/284 415/115 |
| 5,203,873 A * | 4/1993 | Corsmeier | F01D 5/147 416/96 A |
| 5,207,556 A | 5/1993 | Frederick et al. | |
| 5,387,085 A * | 2/1995 | Thomas, Jr. | F01D 5/187 415/115 |
| 6,193,465 B1 * | 2/2001 | Liotta | B23P 15/04 29/889.722 |
| 6,382,906 B1 * | 5/2002 | Brassfield | F01D 5/18 415/115 |
| 6,453,557 B1 * | 9/2002 | Burdgick | F01D 5/189 29/889.7 |
| 6,874,988 B2 * | 4/2005 | Tiemann | F01D 5/189 415/115 |
| 7,819,628 B2 * | 10/2010 | Dervaux | F01D 5/18 415/115 |
| 8,137,055 B2 | 3/2012 | Lang | |
| 8,182,223 B2 * | 5/2012 | Pal | F01D 5/189 416/96 A |
| 2008/0260537 A1 * | 10/2008 | Lang | F01D 5/189 416/96 R |
| 2014/0219788 A1 * | 8/2014 | Nilsson | F01D 5/189 415/175 |
| 2014/0271101 A1 * | 9/2014 | Slavens | F01D 5/187 415/1 |
| 2016/0222822 A1 * | 8/2016 | Jennings | F01D 5/284 |
| 2017/0138200 A1 * | 5/2017 | Negulescu | F01D 5/081 |

FOREIGN PATENT DOCUMENTS

| | | | |
|---|---|---|---|
| EP | 0990771 A1 | 4/2000 | |
| EP | 1589192 A1 | 10/2005 | |
| EP | 2224097 A2 * | 9/2010 | F01D 5/189 |
| EP | 2573325 A1 | 3/2013 | |
| EP | 3002412 A1 | 4/2016 | |
| WO | WO2016030157 A1 | 3/2016 | |

OTHER PUBLICATIONS

German Search Report dated Aug. 8, 2017 for counterpart German Application No. 10 2016 216 858.4.
Braeunling, Willi J.G., Flugzeugtriebwerke. Grundlagen, Aero-Thermodynamik, Ideale und reale Kreisprozesse, Thermische Turbomaschinen, Komponten, Emissionen und Systeme (Aircraft Engines. Aero-Thermodynamics, Ideal and Real Circuits, Thermal Turbomachines, Components, Emissions and Systems) 4th ed.Berlin: Springer Vieweg. 2015, p. 234-240.
European Office Action dated Mar. 24, 2020 for counterpart European Patent Application No. 17189024.7.

* cited by examiner

ROTOR BLADE FOR A TURBOMACHINE AND METHOD FOR THE ASSEMBLY OF A ROTOR BLADE FOR A TURBOMACHINE

REFERENCE TO RELATED APPLICATION

This application claims priority to German Patent Application No. 10 2016 216 858.4 filed on Sep. 6, 2016, the entirety of which is incorporated by reference herein.

BACKGROUND

The invention relates to a rotor blade for a turbomachine and a method for assembling a rotor blade.

Rotor blades in turbomachines, in particular in turbines, are subjected to considerable thermal as well as mechanical loads. Cooling devices with impingement cooling systems are known from U.S. Pat. No. 3,846,041 A or U.S. Pat. No. 8,182,223 B2, for example.

SUMMARY

Nevertheless, there is the objective to provide rotor blade cooling systems that are configured in a thermally efficient and mechanically robust manner.

The objective is achieved through the rotor blade with features as described herein.

This rotor blade has a cooling arrangement for cooling a surface inside the rotor blade by means of a cooling medium (in particular by means of cooling air). Here, an impingement cooling device with a plurality of impingement cooling openings serves for deflecting the cooling medium that flows in the interior of the impingement cooling device onto the surface to be cooled that is located outside of the impingement cooling device and inside the rotor blade, so that the surface to be cooled can be cooled through impingement cooling by means of the cooling medium that exits the impingement cooling openings. To improve the mechanical mounting, in particular to compensate for thermal stresses, the impingement cooling device is mounted so as to be movable with respect to the rotor blade.

Through the improved cooling, the requirements for the coating of the rotor blade are reduced, or the coating even becomes superfluous. The use of this impingement cooling device also allows for a cost-effective manufacture, especially when it comes to smaller rotor blades in turbines. For example, the combustion in an aircraft engine can also be improved by economizing cooling air.

In one embodiment, the impingement cooling can be ensured in an efficient manner by arranging the impingement cooling device inside the rotor blade at least partially in parallel to the surface to be cooled. Thus, the cooling medium exiting from the impingement cooling openings impinges on the surface to be cooled in a perpendicular or substantially perpendicular manner, wherein the surface to be cooled is in particular arranged at the inner side of the rotor blade leading edge, since it is usually here that the highest temperatures are present.

In one embodiment, this can for example be achieved by forming the impingement cooling device at least partially as a hollow cylinder. The cylinder cross-section of the impingement cooling device can for example be formed in a circular, elliptical, square or polygonal manner.

For a maximal cooling effect, in one embodiment the impingement cooling device extends from a bottom connection in the area of a rotor blade platform all the way to the tip of the rotor blade.

The impingement cooling device is mounted in the area of the rotor blade platform opposite the rotor blade, wherein in one embodiment this mounting is embodied so as to be axially displaceable, in particular through a clearance fit or a slide bearing connection. This can serve for compensating for any thermal and/or mechanical stresses.

In one embodiment, the connection of the impingement cooling device can be formed in a centering manner at the tip of the rotor blade at the top end, so that the impingement cooling device can return into the centering seat in the event of a small deflection.

In one embodiment, the connection of the impingement cooling device has a form fit at the tip of the rotor blade, in particular as an anti-rotation device, through a square connection, or as a bayonet joint.

In one embodiment, the connection of the impingement cooling device has a solder connection or a welded connection at the tip of the rotor blade, in particular between a locking socket and the tip.

In one embodiment, the impingement cooling openings of the impingement cooling device are arranged along the longitudinal axis for a particularly efficient cooling. In one embodiment, the density of the impingement cooling openings of the impingement cooling device at the tip of the rotor blade can be higher at least in a partial area than in other areas of the impingement cooling device. Thus, the aperture density can be adjusted to the cooling requirements.

The cooling can also be improved if the impingement cooling openings of the impingement cooling device can be directed in a targeted manner onto an area of the surface to be cooled.

In one embodiment, the impingement cooling device can have an elastic thermal compensator, in particular a gaiter, at the base of the rotor blade for adjustment to length changes.

In one embodiment, at least one lateral guiding element (e.g. a rib) arranged at the outer side of the impingement cooling device and/or the inner side of the cooling channel for the purpose of guiding the impingement cooling device can be used for mechanical stabilization.

In one embodiment, the impingement cooling openings of the impingement cooling device have a throttling effect.

The objective is achieved through a method with features as described herein.

BRIEF DESCRIPTION OF THE DRAWINGS

The invention is explained in connection with the exemplary embodiments that are shown in the Figures.

DETAILED DESCRIPTION

Figure 1:
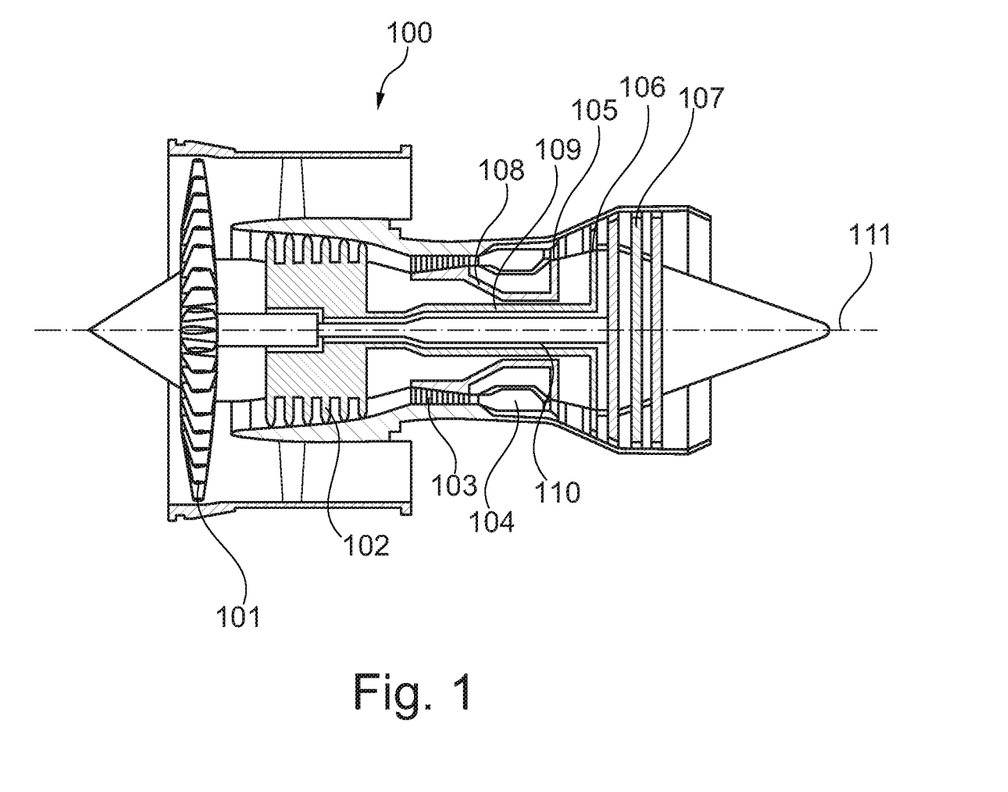
FIG. 1 shows a schematic illustration of an aircraft engine.

FIG. 1 shows a per se known three-shaft aircraft engine 100 as an example of a turbomachine. The aircraft engine 100 has a fan stage 101, a medium-pressure compressor stage 102, and a high-pressure compressor stage 103. They are driven by turbine stages, namely a high-pressure turbine 105, a medium-pressure turbine 106, and a low-pressure turbine 107 in the known manner via a high-pressure shaft 108, a medium-pressure shaft 109, and a low-pressure shaft 110. Further, the aircraft engine 100 also has a combustion chamber 104. The shafts 108, 109, 110 and the parts connected thereto rotate about the rotational axis 111.

Here, the fan stage 101, the compressor stages 102, 103, and the turbine stages 105, 106, 107 respectively have multiple rotor blades 10 that supply work or extract work from the air that flows into the engine 100.

Here, the turbine stages 105, 106, 107 are particularly exposed to high temperatures. The hot gas temperatures, in particular at the entry of the high-pressure turbine 105, partially lie above the melting point of the blade materials. Usually, this makes measures for cooling the rotor blades 10 necessary.

Figure 2:
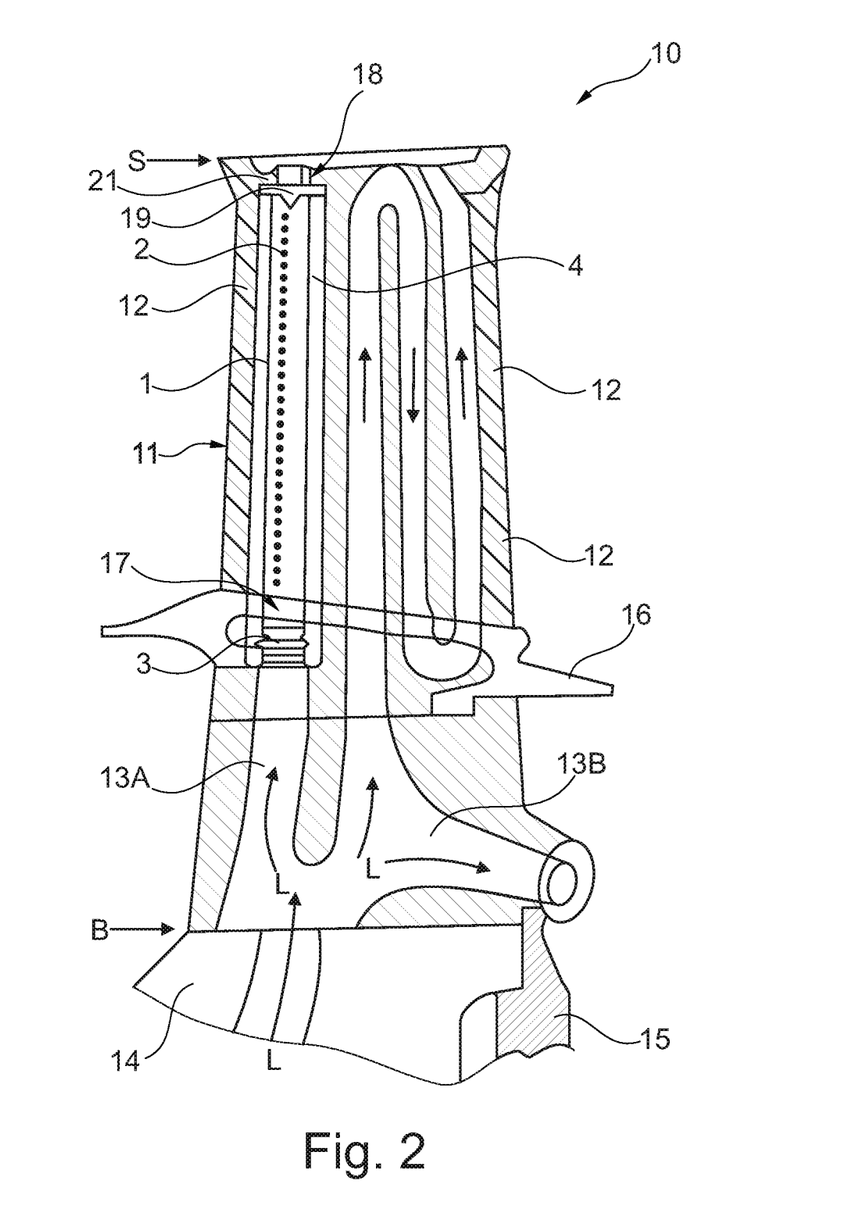
FIG. 2 shows a schematic longitudinal section illustration of a rotor blade with an embodiment of an impingement cooling device for impingement cooling.

In the present embodiment, compressor air is used as the cooling medium L that is guided inside the aircraft engine 100 to the base B of a rotor blade 10. In FIG. 2, the rotor blade 10 of a turbine stage 105, 106, 107 is shown in a schematic longitudinal section. The base B is connected to a turbine shaft 108, 109, 110, which is not shown here, via a disc rim 14, which is partially shown. An axial locking ring 15 ensures a secure retention of the rotor blade 10.

The cooling medium L is guided through cooling channels 13A, 13B into the interior of the rotor blade 10. Here, the cooling medium L divides into two cooling channels 13A, 13B. In the embodiment according to FIG. 2, the first cooling channel 13A (leading edge channel) is arranged at the rotor blade leading edge 11. The first cooling channel 13A extends substantially in a straight manner from the base B to the tip S of the rotor blade 10. In the rest of the rotor blade 10, a meandering second cooling channel 13B is arranged for convective cooling.

The cooling medium L partially exits from the rotor blade 10 through the film cooling openings 12, cooling it from the outside through a film cooling.

In the shown embodiment, an additional cooling effect is realized in the interior of the rotor blade 10 in the area of the rotor blade leading edge 11 by means of impingement cooling and through an impingement cooling device 1 that is especially embodied for this purpose.

In impingement cooling, the cooling medium L is blown directly onto the surface 20 to be cooled in the interior of the rotor blade 10, i.e. at the inner side of the leading edge channel (first cooling channel 13A), especially in the area of the rotor blade leading edge 11. Before the arrangement of the impingement cooling device 1 inside the rotor blade 10 is discussed, the flow conditions are schematically shown based on FIG. 3.

Figure 3:
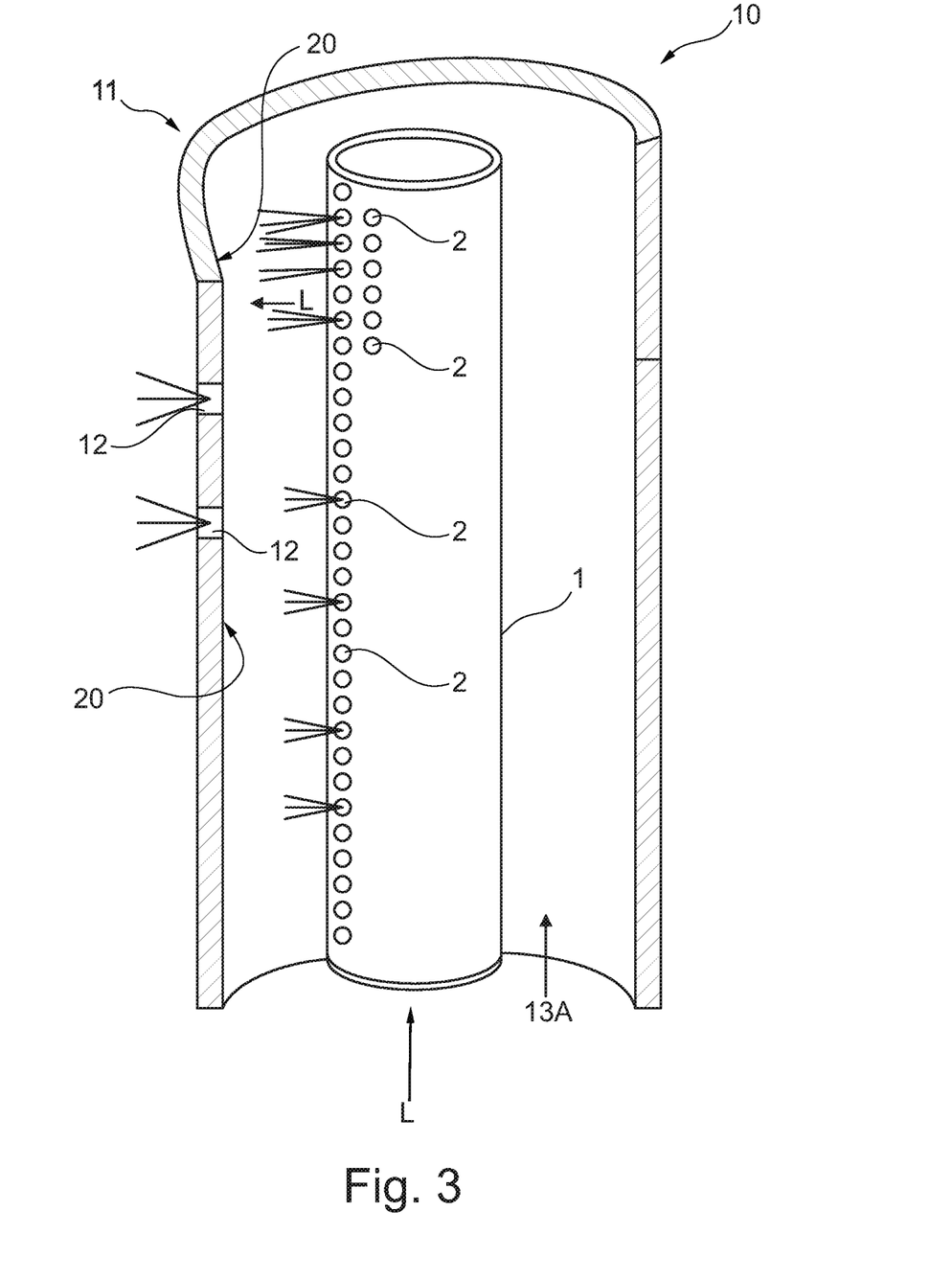
FIG. 3 shows a schematic perspective illustration of the impingement cooling of an inner surface through an embodiment of an impingement cooling device.

Here, the impingement cooling device 1 is embodied as a straight hollow cylinder with a constant circular cross section. In other embodiments, the cross-section of the hollow cylinder of the impingement cooling device 1 can also be square, rectangular, polygonal or elliptical. Also, the cross-sectional shape and/or area can vary across the length of the impingement cooling device 1, so that in this case a deviation of the cylinder shape would be present. In general, the impingement cooling device 1 can also be formed in a tubular manner with different cross-section sizes and/or shapes.

Figure 5:
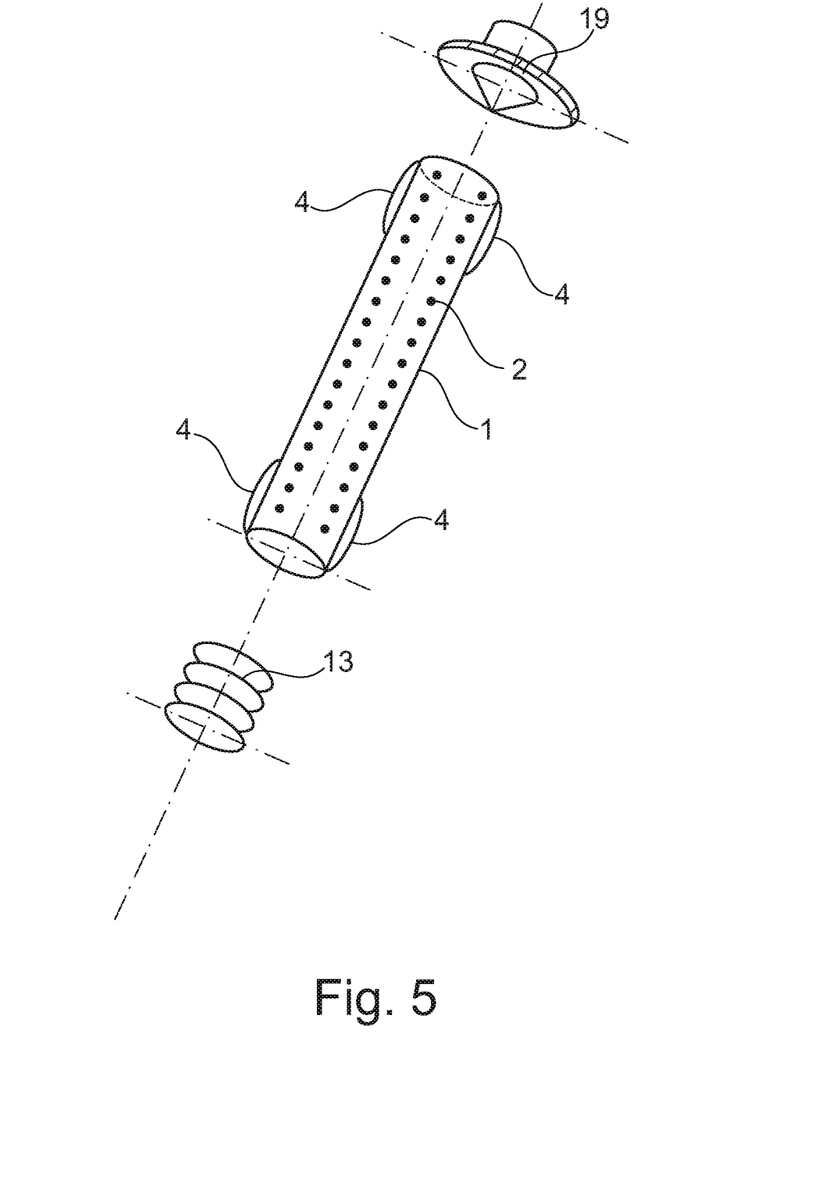
FIG. 5 shows an exploded view of an embodiment of an impingement cooling device.

A radially outwardly oriented guiding element 4 in the form of a rib is arranged at the outer side of the impingement cooling device 1 (see also FIG. 5). It serves for guiding the impingement cooling device 1 inside the interior of the first cooling channel 13A.

At the shell surface of the impingement cooling device 1, which is circular cylindrical in the present case, a plurality of impingement cooling openings 2 (i.e. a perforated field) is arranged, wherein in the present case the impingement cooling openings 2 are oriented in the direction of the rotor blade leading edge 11 and thus towards the surface 20 to be cooled at the inner side of the first cooling channel 13A. FIG. 3 shows only a partial section of the contour of the rotor blade 10. The surface 20 to be cooled is located at the inner side of the first cooling channel 13A.

The cooling medium L is guided under pressure into the first cooling channel 13A (see FIG. 2), and thus also into the impingement cooling device 1. The cooling medium L flows radially outwards inside the cylindrical impingement cooling device 1 in the rotor blade 10 and exits laterally through the impingement cooling openings 2 in the shell surface of the impingement cooling device 1. Thus, the flow of the cooling medium L is deflected by 90° and guided in the form of impingement cooling onto the surface 20 to be cooled at the inner side of the first cooling channel 13A. Here, the angle specifications and the impingement direction of the cooling medium are to be understood as averaged specifications, since a flow does not behave like a polyline.

The impingement cooling is a very efficient form of convection cooling, in which the cooling medium L impinges on the surface 20 to be cooled. Here, a high cooling effect is achieved especially in the stagnation point of the impact jets. Here, the stagnation points lie on the surface 20 to be cooled.

In the embodiment according to FIG. 3, the density of the impingement cooling openings 2 per unit area at the tip S of the rotor blade 10 is higher than at the base B, since the heat load of the rotor blade 10 increases in upward direction. Principally, also a homogenous distribution of the impingement cooling openings 2, a steadily changing distribution of the impingement cooling openings 2, or an isolated arrangement of the impingement cooling openings 2 can be used for the targeted cooling of hot partial areas of the surface 20. Here, the impingement cooling openings 2 of the impingement cooling device 1 are not directed towards the film cooling openings 12 (for reasons of clarity only two of them are shown here) in the outer wall of the rotor blade 10, but rather are directed in a targeted manner onto the wall areas between the film cooling openings 12, since the areas of the surface 20 to be cooled are located there.

A typical external diameter of the impingement cooling device 1 can be between 3 and 5 mm, wherein the dimensions can be adjusted to the hollow space in the interior of the rotor blade 10. The wall thickness of the impingement cooling device 1 can be between 0.2 and 0.5 mm. The length of the impingement cooling device 1 can be between 20 and 60 mm depending on the rotor blade length. The gap between the surface 20 to be cooled and the impingement cooling device 1 can be 1 to 3 mm, for example. The cooling medium L has a pressure of between 20 and 30 bar in the interior of the impingement cooling device 1.

In the shown embodiment, the impingement cooling openings 2 all have the same circular diameter, i.e. between 0.2 and 0.5 mm. In other embodiments, the shape (e.g. as a slot) and/or the size of the impingement cooling openings 2 can be adjusted to the respective cooling task. With the present conditions, the pressure loss of the cooling medium flow through the impingement cooling openings 2 is approximately 2 to 4 bar. Thus, the impingement cooling device 1 has a throttling effect.

Here, the impingement cooling device 1 can be made of the same materials as the rotor blade (e.g. Inconel).

FIG. 2 shows how the impingement cooling device 1 is mounted inside the rotor blade 10.

At the bottom end of the impingement cooling device 1, i.e. in the area of a rotor blade platform 16, the impingement cooling device 1 is mounted axially inside a push fit as a bottom connection 17. The tubular impingement cooling device 1 is mounted by means of a clearance fit of a corresponding bore. Thus, the impingement cooling device 1 can move axially under thermal and/or mechanical loads in the rotor blade 10.

Further, shown here is an elastic thermal compensator 3 (e.g. as a gaiter) that can be used as an alternative to the clearance fit.

At the top end of the impingement cooling device 1, i.e. at the tip S of the rotor blade 10, the impingement cooling device 1 has a positive-locking centering top mounting 18 that is secured against twisting. At that, the top part of the impingement cooling device 1 has a square shaft as a locking socket 19 that engages a corresponding square shaft indentation of a receiving fixture 21 for the locking socket 19. A locking socket 19 with an elliptical cross-section is used in connection with the embodiment shown in FIG. 4A.

Alternatively, the impingement cooling device 1 can also have a concave, in particular spherical, shape at the top end, engaging a corresponding indentation in the rotor blade 10. However, a bayonet joint can also be used as a part of the lock (see FIG. 4A).

Figure 4A:
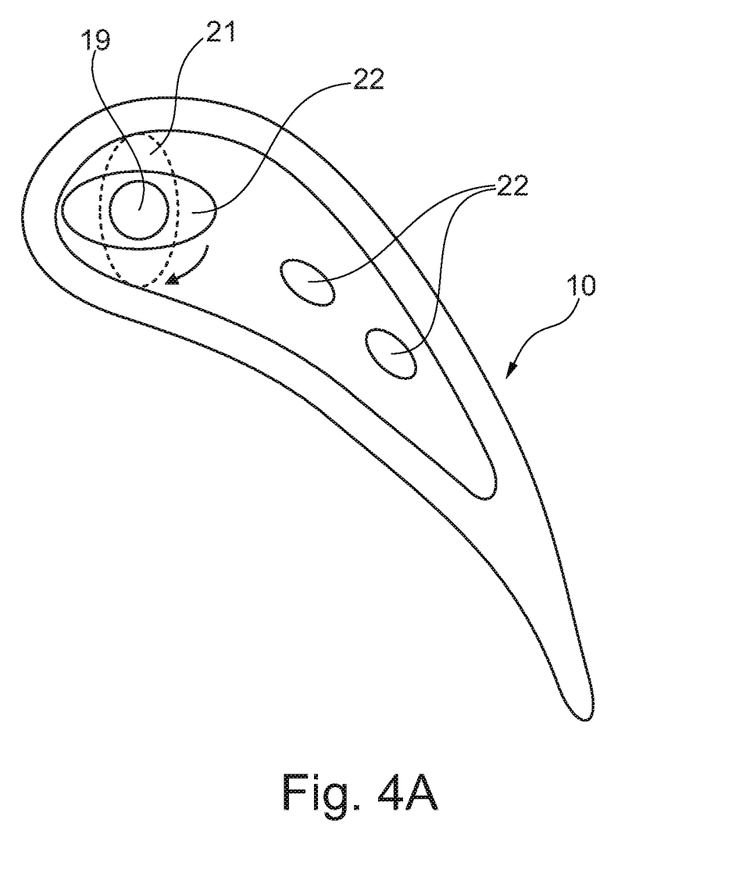
FIG. 4A shows a schematic cross-sectional illustration of a rotor blade with an embodiment of an impingement cooling device.

FIG. 4A shows a cross-section through an embodiment of the rotor blade 10 with an impingement cooling device 1, with the locking socket 19 having an elliptical cross-section. Through a rotation in the arrow direction—in the sense of a bayonet joint—it can be brought into a form-fit engagement with an elliptical receiving fixture 21 for the locking socket 19. Here, the receiving fixture 21 is arranged in the tip shroud of the rotor blade 10, which is not shown here. Subsequently, the locked impingement cooling device 1 can be soldered to the tip S of the rotor blade 10 at the connection points 22. The soldering joints can have hard soldering inserts for closing the cooling channels 13A, 13B.

Figure 4B:
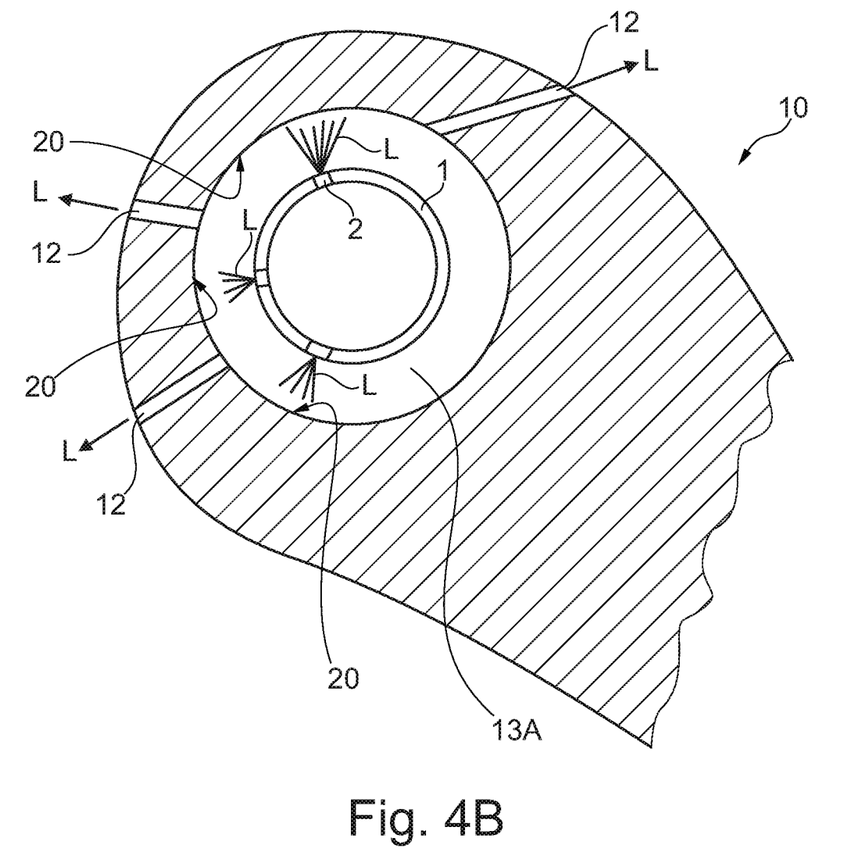
FIG. 4B shows a schematic cross-sectional illustration of a rotor blade with a further embodiment of an impingement cooling device.

FIG. 4B shows a cross-section through a further embodiment of the rotor blade 10. At that, the impingement cooling device 1 is arranged in the first cooling channel 13A. The impingement cooling openings 2, out of which the cooling medium L exits, are optimally aligned due to the mounting via the top connection 18 by means of the locking socket 19, such that the film cooling openings 12 in the wall of the rotor blade 10 are not hit by the cooling medium L, but the surface 20 to be cooled at the inner side of the leading edge channel.

After the impingement cooling, the cooling medium L exits from the film cooling openings 12.

FIG. 5 shows an axonometric illustration of an embodiment of an impingement cooling device 1. Here, the elastic thermal compensator 13 is arranged at the bottom end, which may be configured as a separate unit or in one piece with the impingement cooling device 1. The locking socket 19 at the top end serves for connecting the impingement cooling device 1 with the top part of the rotor blade 10 (see FIG. 2). The bottom side of the locking socket 19 has a conical projection that engages the cross-section of the impingement cooling device 1, which is circular in this case. The top side of the locking socket 19 comprises the form-fit connection means, e.g. through the square shaft or the bayonet joint.

Guiding elements 4 pointing radially outwards and which can establish a good positioning inside the cooling channel 13A, are arranged laterally at the impingement cooling device 1. Thus, e.g. three guiding elements 4 (e.g. as a rib) can be arranged offset by respectively 120° externally on the impingement cooling device 1. Additionally or alternatively, the guiding elements 4 can also be arranged at the inner side of the cooling channel 13A.

PARTS LIST 1 impingement cooling device
2 impingement cooling openings
3 elastic thermal compensator
4 guiding element
10 rotor blade
11 rotor blade leading edge
12 film cooling openings
13A first cooling channel (rotor blade leading edge channel)
13B second cooling channel
14 disc rim
15 axial locking ring
16 rotor blade platform
17 bottom connection of the impingement cooling device in the area of the rotor blade platform
18 top connection of the impingement cooling device
19 locking socket
20 surface to be cooled (inner wall of the cooling channel)
21 receiving fixture for the locking nozzle (seat)
22 connection points (soldering)
100 turbomachine, aircraft engine
101 fan stage
102 medium-pressure compressor stage
103 high-pressure compressor stage
104 combustion chamber
105 high-pressure turbine
106 medium-pressure turbine
107 low-pressure turbine
108 high-pressure shaft
109 medium-pressure shaft
110 low-pressure shaft
111 rotational axis
B base of the rotor blade
L cooling medium, cooling air
S tip of the rotor blade

The invention claimed is:

1. A rotor blade for a turbomachine, comprising:
a cooling arrangement for cooling a surface inside the rotor blade with a cooling medium,
the cooling arrangement including an impingement cooling device with a plurality of impingement cooling openings for deflecting the cooling medium flowing in an interior of the impingement cooling device onto the surface inside the rotor blade and that is located outside of the impingement cooling device, to cool the surface through impingement cooling by the cooling medium exiting from the impingement cooling openings, wherein the impingement cooling device has a longitudinal axis;
a bottom connection positioned in an area of the rotor blade platform and including a clearance fit or a slide bearing connection movably mounting the impingement cooling device in an axially displaceable manner with respect to the rotor blade;
an anti-rotation top connection for the impingement cooling device to prevent rotation of the impingement cooling device about the longitudinal axis with respect to the rotor blade, the top connection having a form fit with the impingement cooling device and including a locking socket and a receiving fixture, wherein a shape of a periphery of the receiving fixture around the longitudinal axis corresponds to a shape of a periphery of the locking socket around the longitudinal axis, wherein the locking socket engaging the receiving fixture establishes the form fit such that in a radial direction from the longitudinal axis at the form fit, there is at least one area where the periphery of the locking socket and the periphery of the receiving fixture radially overlap each other so that the locking socket is blocked from rotation by the receiving fixture; wherein the periphery of the receiving fixture and the periphery of the locking socket have at least one chosen from 1) a rectangular shape around the longitudinal axis, 2) an elliptical shape around the longitudinal axis, 3) a spherical shape and a corresponding shape around the longitudinal axis, and 4) a bayonet connection.

2. The rotor blade according to claim 1, wherein the impingement cooling device is arranged inside the rotor blade at least partially in parallel to the surface, so that the exiting cooling medium impinges onto the surface in a perpendicular manner.

3. The rotor blade according to claim 1, wherein the impingement cooling device is formed at least partially as a hollow cylinder.

4. The rotor blade according to claim 3, wherein an exterior cross-section of the hollow cylinder is circular, elliptical, square, or polygonal.

5. The rotor blade according to claim 1, wherein the impingement cooling device extends from the bottom connection to a tip of the rotor blade.

6. The rotor blade according to claim 1, wherein the top connection centers the impingement cooling device at a tip of the rotor blade.

7. The rotor blade according to claim 1, wherein the plurality of impingement cooling openings are arranged along a longitudinal axis of the impingement cooling device.

8. The rotor blade according to claim 1, wherein, at least for a partial area, a density of the plurality of impingement cooling openings in the impingement cooling device at a tip of the rotor blade is higher than in other areas of the impingement cooling device.

9. The rotor blade according to claim 1, wherein the plurality of impingement cooling openings of the impingement cooling device are directed in a targeted manner onto an area of the surface to be cooled.

10. The rotor blade according to claim 1, wherein the impingement cooling device includes an elastic thermal compensator, comprising a gaiter, at a base of the rotor blade.

11. The rotor blade according to claim 1, and further comprising at least one lateral guiding element for guiding the impingement cooling device, the at least one lateral guiding element being positioned at at least one chosen from an outer side of the impingement cooling device and an inner side of the cooling channel, the at least one lateral guiding element including a rib engaging a corresponding opposing surface.

12. The rotor blade according to claim 1, wherein the impingement cooling openings provide a throttling effect to the cooling medium.

13. The rotor blade according to claim 1 wherein the turbomachine is an aircraft engine.

14. The rotor blade according to claim 1 wherein the cooling medium is air.

15. The rotor blade according to claim 1 wherein the surface to be cooled is arranged at an inner side of a leading edge of the rotor blade.

16. A method for assembling a rotor blade, comprising:
  a) providing a rotor blade,
  b) installing into a cooling channel in an interior of the rotor blade an impingement cooling device through which a cooling medium can flow and which has a plurality of impingement cooling openings for deflecting the cooling medium flowing in the interior of the impingement cooling device onto a surface located outside of the impingement cooling device, wherein the impingement cooling device has a longitudinal axis; and subsequently
  c) providing a bottom connection positioned in an area of the rotor blade platform and including a clearance fit or a slide bearing connection movably mounting the impingement cooling device in an axially displaceable manner with respect to the rotor blade;
  d) providing an anti-rotation top connection for the impingement cooling device to prevent rotation of the impingement cooling device about the longitudinal axis with respect to the rotor blade, the top connection having a form fit with the impingement cooling device and including a locking socket and a receiving fixture, wherein a shape of a periphery of the receiving fixture around the longitudinal axis corresponds to a shape of a periphery of the locking socket around the longitudinal axis, wherein the locking socket engaging the receiving fixture establishes the form fit such that in a radial direction from the longitudinal axis at the form fit, there is at least one area where the periphery of the locking socket and the periphery of the receiving fixture radially overlap each other so that the locking socket is blocked from rotation by the receiving fixture; wherein the periphery of the receiving fixture and the periphery of the locking socket have at least one chosen from 1) a rectangular shape around the longitudinal axis, 2) an elliptical shape around the longitudinal axis, 3) a spherical shape and a corresponding shape around the longitudinal axis, and 4) a bayonet connection.

17. The method for assembling a rotor blade according to claim 16, wherein the rotor blade is a cast or forged rotor blade.

* * * * *